(12) United States Patent
Shiga et al.

(10) Patent No.: US 6,492,749 B1
(45) Date of Patent: Dec. 10, 2002

(54) MOLDED CORE FOR ELECTRIC MOTOR

(75) Inventors: Tsuyoshi Shiga, Nagoya (JP); Yoshiyasu Goto, Hashima-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/634,837

(22) Filed: Aug. 8, 2000

(30) Foreign Application Priority Data

Aug. 9, 1999 (JP) .......................................... 11-225199

(51) Int. Cl.[7] .................................................. H02K 1/04
(52) U.S. Cl. .......................... 310/43; 310/259; 310/216
(58) Field of Search ............................. 310/43, 42, 45, 310/216, 218, 254, 258, 259

(56) References Cited

U.S. PATENT DOCUMENTS

| | | | |
|---|---|---|---|
| 4,015,154 A | * 3/1977 | Tanaka et al. | ................. 310/42 |
| 5,040,285 A | 8/1991 | Williams et al. | |
| 5,150,589 A | 9/1992 | Williams et al. | |
| 5,834,873 A | * 11/1998 | Muller | ........................ 310/186 |
| 6,166,474 A | * 12/2000 | Kohara et al. | ............... 310/258 |

OTHER PUBLICATIONS

Abstract of New Zealand Patent No. 226374 filed Sep. 28, 1988.
Abstract of New Zealand Patent No. 247033 filed Sep. 28, 1988.

* cited by examiner

*Primary Examiner*—Thomas M. Dougherty
*Assistant Examiner*—Thanh Lam
(74) *Attorney, Agent, or Firm*—Pillsbury Winthrop LLP (57) ABSTRACT

A molded core for an electric motor includes a resin cover formed by placing a stator core in a cavity of a molding die and injecting a molten insulating resin into the cavity of the molding die so that the resin cover is formed on an outer surface of the stator core by means of molding. The molded core includes a generally annular yoke, a plurality of teeth radially extending from the yoke, the yoke and the teeth constituting the stator core, and a plurality of distal end resin cover portions included in the resin cover and covering distal end faces of the teeth respectively, the distal end resin cover portions having different radial dimensions.

7 Claims, 7 Drawing Sheets

MOLDED CORE FOR ELECTRIC MOTOR

BACKGROUND OF THE INVENTION

1. Field of the Invention

This invention relates to a molded core for an electric motor including a resin cover formed on an outer face of the core by means of injection molding.

2. Description of the Prior Art

Figure 8:
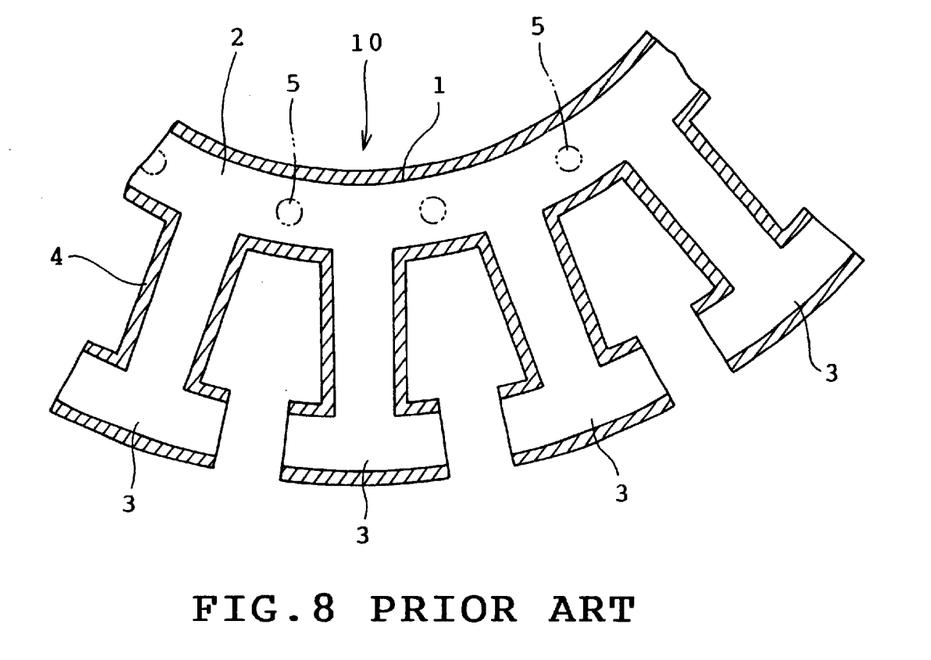
FIG. 8 is a view similar to FIG. 1, showing a conventional molded core.

FIG. 8 illustrates a conventional molded core. The molded core 10 comprises a stator core 1 and a resin cover 4 covering an outer face of the stator core. The stator core 1 is formed by stamping out a predetermined shape of steel sheet and stacking a number of such steel sheets. The stator core 1 includes an annular yoke 2 and a plurality of teeth 3 extending radially from an outer circumference of the yoke. In forming the resin cover 4, the stator core 1 is placed in a molding die (not shown). A molten insulating resin is injected into the molding die by an injection molding machine so that the resin cover 4 is formed by means of injection molding. The resin cover 4 usually has a substantially uniform thickness in its entirety.

In order that the molten resin may fill a cavity of the molding die at a uniform fluidity so that a distal end of each tooth 3 is immersed in it, a number of gates 5 through which the molten resin is injected into the die cavity are formed in the molding die so that distances between the gates 5 and the respective corresponding teeth 3 are equal to one another. However, the resin cover 4 has a relatively smaller and generally uniform thickness. Moreover, since the distance that the molten resin flows is increased as it approaches the distal end of the tooth 3, the fluid resistance is increased and accordingly the fluidity of the molten resin is reduced.

Figure 9:
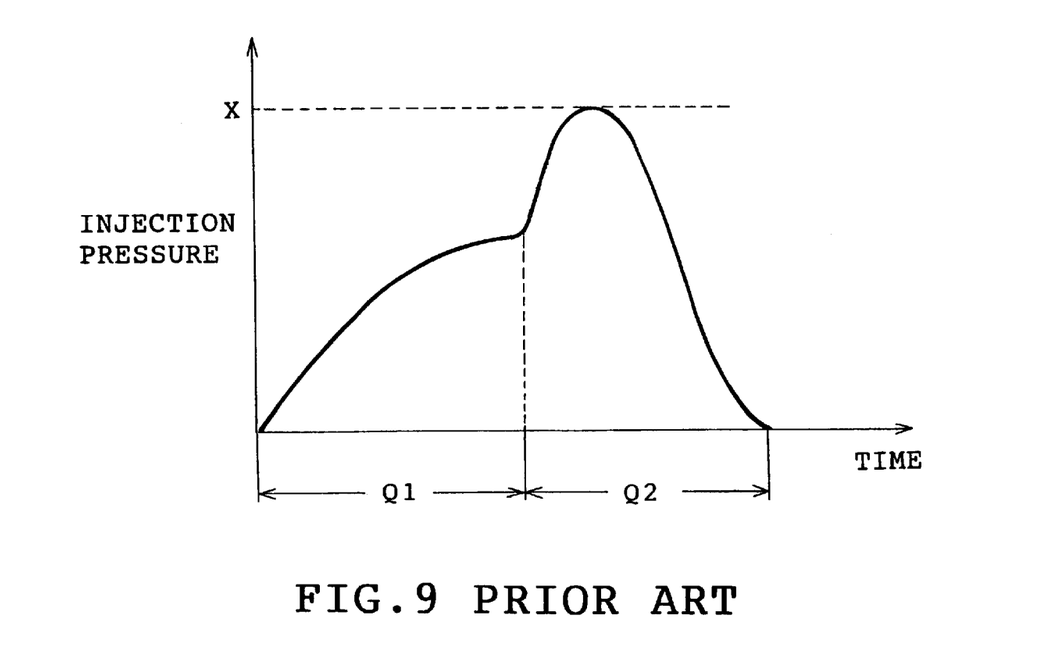
FIG. 9 is a view similar to FIG. 5, showing the conventional molded core.

For the purpose of overcoming this problem, a maximum injection pressure is required when the molten resin is injected to fill the die cavity so that the end of each tooth 3 is immersed in it as shown in FIG. 9. More specifically, FIG. 9 shows variations in the injection pressure with progress of time in the process of injecting the molten resin. The molten resin is primarily injected to fill the die cavity so that the yoke 2 is immersed in it in a first half stage Q1, whereas the molten resin is primarily injected to fill the die cavity so that the ends of the teeth 3 are immersed in it in the second half stage Q2. As obvious from FIG. 9, the fluid resistance is small in the stage Q1 since the yoke 2 is located near the gates 5. As a result, the molten resin is injected with a small injection pressure in the stage Q1. On the other hand, the fluid resistance is large in the stage Q2 since the ends of the teeth 3 are located further away from the gates 5. Accordingly, the molten resin is injected with the maximum injection pressure X in the stage Q2.

The gates 5 are disposed so that the distances between the gates and the respective corresponding teeth 3 are equal to one another, as described above. Accordingly, the molten resin is injected so that the ends of the respective teeth 3 are synchronously immersed in it. As a result, the pressure is dispersed to the teeth 3 even when the molten resin is injected with the maximum injection pressure X. This reduces the substantial injection pressure for each tooth 3, whereupon there is a possibility that the molten resin may not reach the distal end of each tooth 3.

On the other hand, the prior art has proposed use of a large-sized injection molding machine having a high maximum injection pressure. However, such a large-sized injection molding machine is expensive, increasing the manufacturing cost of the motor. Further, the increase in the maximum injection pressure distorts the stator core 1 during the molding and/or results in a large number of fins protruding from a contact surface of the molding dies.

SUMMARY OF THE INVENTION

Therefore, an object of the present invention is provide a molded core which includes a resin cover formed on an outer face thereof by means of molding and in which as the result of an improvement in the fluidity balance of the molten resin, the molten resin can reliably be injected to fill the die cavity so that the distal end of each tooth is immersed in it.

To achieve the object, the present invention provides a molded core for an electric motor, which includes a resin cover formed by placing a stator core in a cavity of a molding die and injecting a molten insulating resin into the cavity of the molding die so that a resin cover is formed on an outer surface of the stator core by means of molding. The molded core comprises a generally annular yoke, a plurality of teeth radially extending from the yoke, the yoke and the teeth constituting the stator core, the teeth including alternately arranged first and second teeth, each first tooth having a larger radial dimension than each second tooth, and a plurality of distal end resin cover portions included in the resin cover and covering distal end faces of the teeth respectively, the distal end resin cover portions having different radial dimensions, the distal end resin cover portion of each second tooth having a larger radial dimension than the distal end resin cover portion of each first tooth.

According to the above-described construction, the fluidity of the insulating resin is improved in the distal end of each tooth having the distal end resin cover portion with the larger radial dimension. Accordingly, the insulating resin injected into the cavity of the molding die first flows to an outer face of each tooth having the distal end resin cover portion with the larger radial dimension. Thereafter,the insulating resin flows to an outer face of each tooth having the distal end resin cover portion with the smaller radial dimension. Thus, differing from the conventional construction, the above-described construction can increase the injection pressure. Consequently, the insulating resin can reliably be injected far into the distal end of each tooth.

Furthermore, the teeth include alternately arranged first and second teeth, each first tooth having a larger radial dimension than each second tooth, and the distal end resin cover portion of each second tooth has a larger radial dimension than the distal end resin cover portion of each first tooth. In this construction, the distance that the insulating resin flows is shorter in each second tooth than in each first tooth. Moreover, since the fluidity of the insulating resin is good in the distal end of each tooth, the resin can smoothly be injected to the outer face of each second tooth. Accordingly, the time the resin is injected so that the second teeth are immersed in it is retarded or quickened relative to the time the resin is injected so that the first teeth are immersed in it. Consequently, the injection pressure at which the resin is injected so that each tooth is immersed in it can be increased.

In another preferred form, a sum of the radial dimension of each tooth and the radial dimension of the distal end resin cover portion of each tooth is substantially uniform. When the molded core of the above-described construction is incorporated with a rotor, a mechanical air gap defined between the molded core and the rotor can be rendered substantially uniform over the entire circumference. Consequently, wind noise due to rotation of the rotor can be reduced, and the center of rotation of the rotor can easily be aligned with an axial center of the molded core.

In further another preferred form, the molding die has a plurality of gates through which the insulating resin is injected into the cavity of the molding die, the gates being formed in a portion of the molding die corresponding to the yoke and disposed near the teeth having the distal end resin cover portions with a larger radial dimension respectively. In this construction, the insulating resin can be injected to cover each tooth having the distal end resin cover portion more quickly than to the other teeth. Consequently, the time the molten resin is injected to cover each one tooth is retarded or quickened relative to the time the resin is injected to cover another tooth.

In further another preferred form, the molding die includes a first support pressed against a distal end face of each wide tooth of the stator core placed in the molding die so as to support the stator core and a second support pressed against a distal end face of each narrow tooth so as to support the stator core, and wherein each first support has a portion which is pressed against the wide tooth and which has an area larger than an area of a portion of each second support pressed against the distal end face of the narrow tooth. When the stator core comprises a stack of laminated steel sheets, the injection pressure inevitably displaces the laminated steel sheets radially. In the above-described construction, however, the radial displacement of the steel sheets can be reduced.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
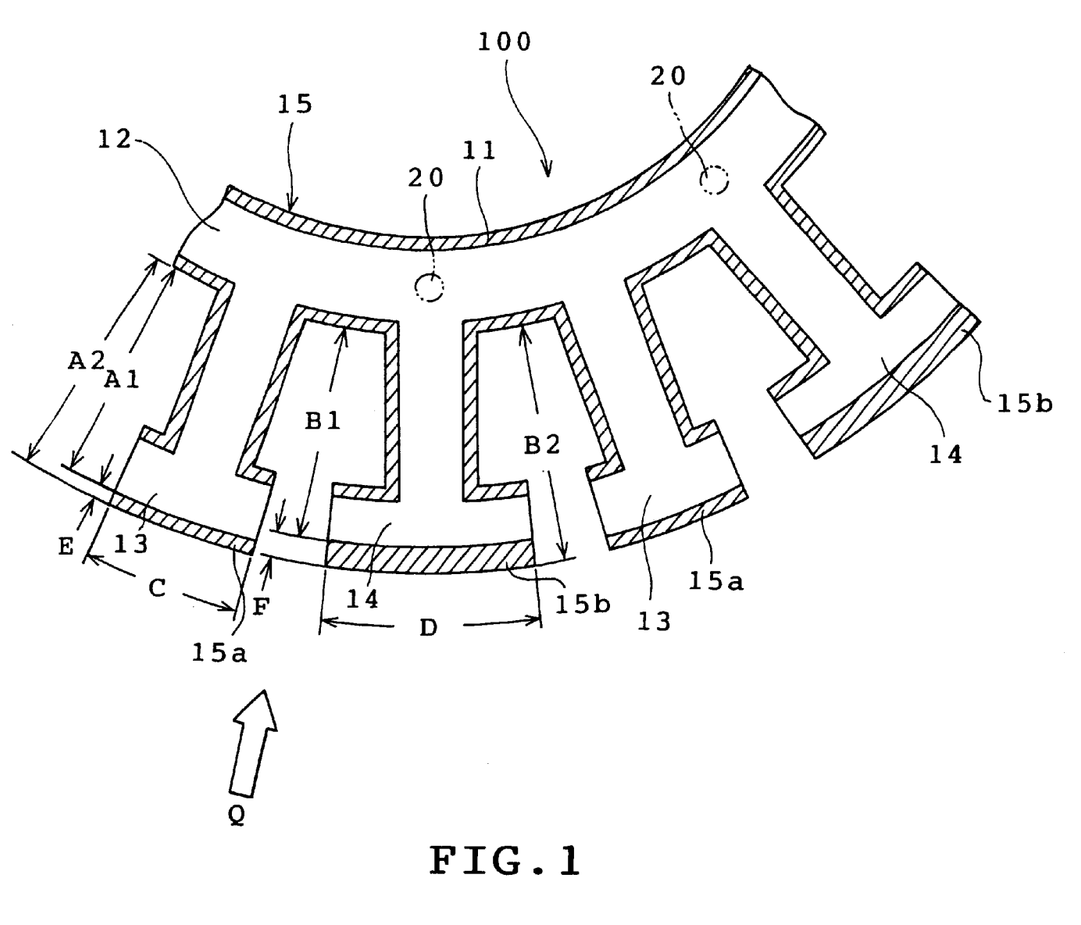
FIG. 1 is a partial longitudinal section of the molded core of a first embodiment in accordance with the present invention.

One embodiment of the present invention will be described with reference to FIGS. 1 to 7. The molded core of the invention is applied to a stator core of a brushless motor of the outer rotor type in which a rotor is disposed around the stator. Referring to FIG. 1, a part of the molded core 100 is shown. The molded core 100 comprises a stator core 11 and an insulating resin cover 15 formed so as to cover an outer face of the stator core by means of injection molding. The stator core 11 is formed by stamping out a predetermined shape of silicon steel sheet and stacking a number of such silicon steel sheets. The silicon steel sheets are further crimped at suitable portions to thereby be integrated. The stator core 11 includes an annular yoke 12 and a plurality of teeth 13 and 14 extending radially from an outer circumference of the yoke. The stator core 11 has an outer diameter set at 100 mm or above and a thickness set at 20 mm or above. More specifically, the outer diameter and the thickness of the stator core 11 are set at 230 mm and 21 mm respectively in the embodiment. The resin cover 15 is made from a material containing, as a main component, polyphenylene sulfide (PPS) which is a thermoplastic resin containing glass powder and having high heat resistance.

The teeth 13 and 14 have different shapes and are arranged on the outer circumference of the yoke 12 alternately. $A1 > B1$ when reference symbols "A1" and "B1" designate a radial dimension of each tooth 13 and a radial dimension of each tooth 14 respectively. $C < D$ when reference symbols "C" and "D" designate a circumferential dimension of a distal end of each tooth 13 and a circumferential dimension of a distal end of each tooth 14 respectively. In the embodiment, each tooth 13 constitutes a first or long tooth and a narrow tooth, whereas each tooth 14 constitutes a second or short tooth and a wide tooth. Further, the resin cover 15 includes a distal end resin cover portion 15a covering a distal end face of each tooth 13 and a distal end resin cover portion 15b covering a distal end face of each tooth 14. $E < F$ when reference symbols "E" and "F" designate a thickness (or radial dimension) E of each distal end resin cover portion 15a and a thickness (or radial dimension) F of each distal end resin cover portion 15b respectively. The dimensions A1, A2, E and F are set so that a sum $A2(A1+E)$ of the radial dimension A1 of each tooth 13 and the thickness E of the distal end resin cover portion 15a becomes substantially equal to a sum $B2(B1+F)$ of the radial dimension B1 of each tooth 14 and the thickness F of the distal end resin cover portion 15b. In the embodiment, however, the thicknesses E and F of the respective distal end resin cover portions 15a and 15b are each set to range between 0.3 mm and 1.0 mm.

Figure 2:
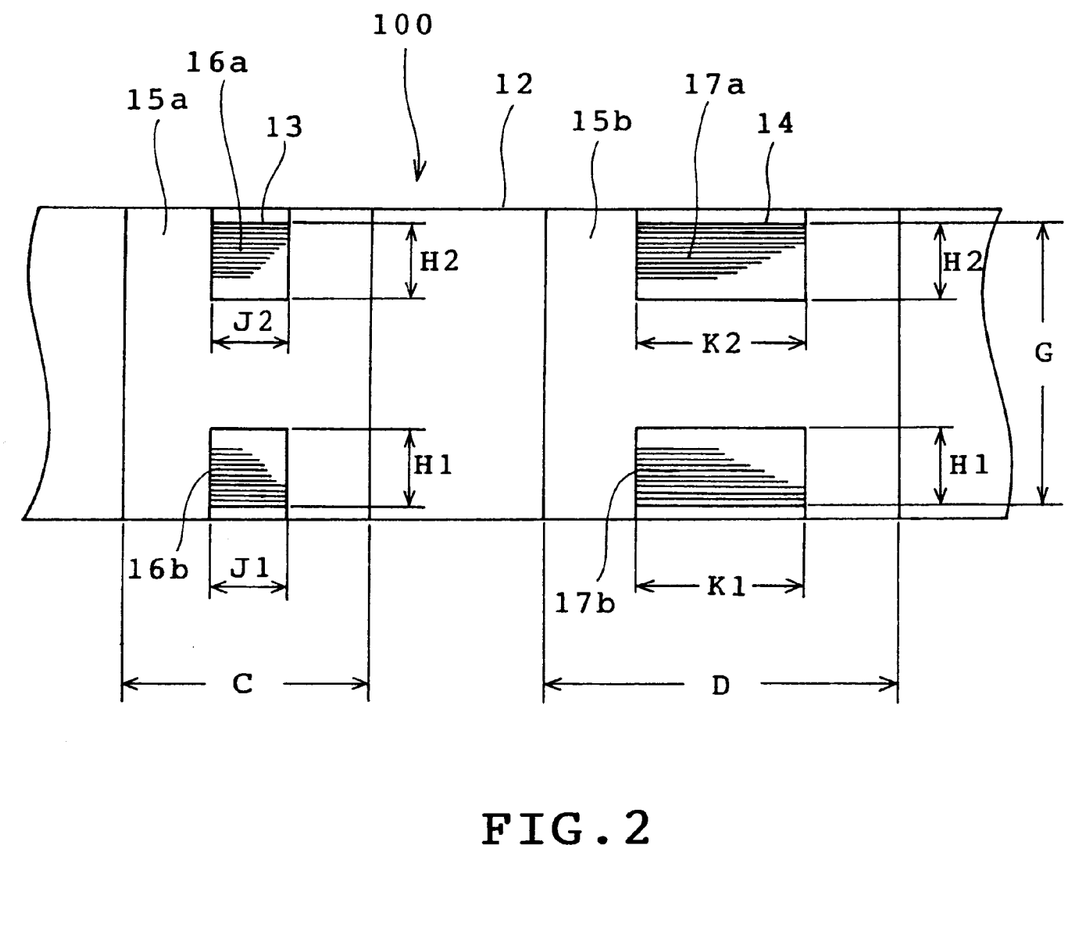
FIG. 2 is a partial side view of the molded core as viewed in the direction of arrow Q in FIG. 1.

Referring now to FIG. 2, the distal end face of each tooth 13 includes upper and lower exposed portions 16a and 16b on each of which the distal end resin cover portion 15a is not formed such that a part of the laminated steel sheet is exposed. The distal end face of each tooth 14 also includes upper and lower exposed portions 17a and 17b. The exposed portions 17a and 17b of each wide tooth 14 have larger areas than the exposed portions 16a and 16b of each narrow tooth 13 respectively. More specifically, the upper exposed portion 16a has the same axial dimension H2 as the upper exposed portion 17a. The lower exposed portion 16b has the same axial dimension H1 as the lower exposed portion 17b. Further, the upper exposed portion 16a has a circumferential dimension J2 that is equal to a circumferential dimension J1 of the lower exposed portion 16b. The upper exposed portion 17a has a circumferential dimension K2 that is equal to a circumferential dimension K1 of the lower exposed portion 17b. The circumferential dimensions J1 and J2 are larger than those K1 and K2 respectively. The distal end resin cover portions 15a and 15b are provided both for integrating the teeth 13 and 14 to reduce oscillation or vibration during rotation of the motor and for preventing the teeth 13 and 14 from rusting. Accordingly, an electrical insulation performance of the molded core 100 is not adversely affected by the exposed portions 16a, 16b, 17a and 17b of the respective teeth 13 and 14.

Figure 3:
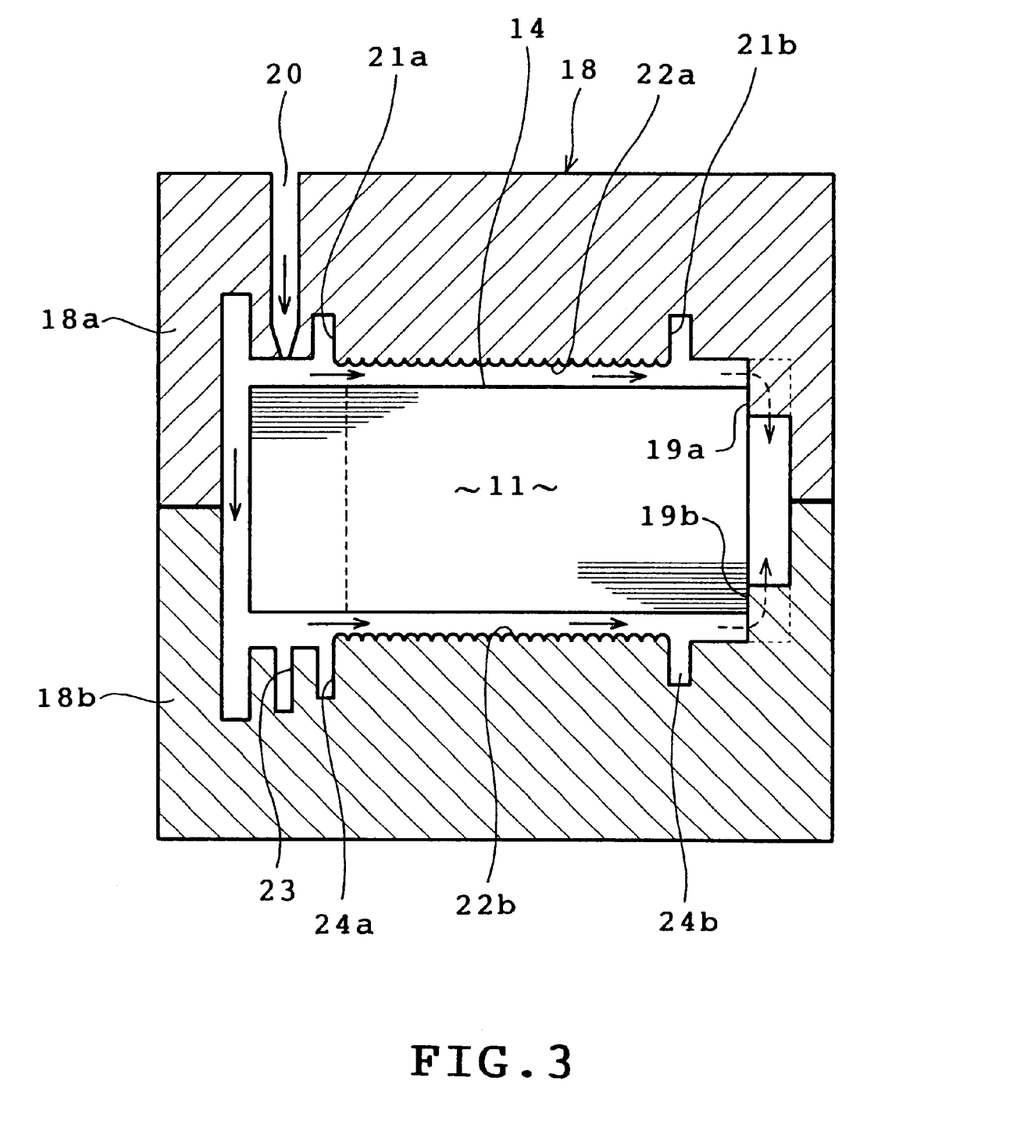
FIG. 3 is a longitudinally side section of a molding die in which the stator core is placed.

A molding die 18 used to form the resin cover 15 over the outer face of the stator core 11 by means of injection molding will now be described with reference to FIG. 3 which also shows the tooth 14 of the stator core 11 placed in the molding die 18 in the longitudinal section as well as the molding die. The molding die 18 includes an upper die 18a and a lower die 18b. The upper die 18a includes a portion corresponding to the yoke 12. The portion is formed with a gate 20 through which molten insulating resin is injected into a cavity of the molding die 18. In the embodiment, a plurality of such gates 20 are formed in the yoke 12 so as to correspond to root portions of the teeth 14 respectively. The gates 20 are shown by imaginary line in FIG. 1.

The upper and lower dies 18a and 18b have supports 19a and 19b protruding from inner surfaces thereof respectively. The supports 19a and 19b are adapted to press against the distal end face of each tooth 14 of the stator core 11 placed in the molding die 18. Thus, the supports 19a and 19b constitute a first support in the invention. A plurality of supporting means are provided on inner surfaces of the upper and lower dies 18a and 18b for pressing the stator core 11 against upper and lower faces respectively although not shown in the drawings. Accordingly, the stator core 11, when placed in the molding die 18, is supported by the supports 19a and 19b, and the other supporting means not shown, whereupon the stator core is held at a predetermined position in the molding die 18. Further, a predetermined gap is defined between the inner surface of the molding die 18 and a portion of the stator core 11 excluding the pressing portions of the supports 19a and 19b etc.

The inner surface of the upper die 18a includes a corrugated face 22a formed to correspond to the upper face of the tooth 14 and two recesses 21a and 21b formed in both ends of the corrugated face 22a. The inner surface of the lower die 18b also includes a corrugated face 22b formed to correspond to the lower face of the tooth 14 and two recesses 24a and 24b formed in both ends of the corrugated face 22b. Further, the lower die 18b includes a recess 23 formed in the inner surface thereof so as to be opposed to the yoke 12.

The exposed portions 17a and 17b are formed by the supports 19a and 19b respectively simultaneously when the resin cover 15 is formed on the outer face of the stator core 11. Grooved faces are also formed by the corrugated faces 22a and 22b respectively simultaneously when the resin cover 15 is formed on the outer face of the stator core 11. Additionally, protrusions are formed by the recesses 21a, 21b, 23, 24a and 24b respectively simultaneously when the resin cover 15 is formed on the outer face of the stator core 11. The grooved faces constitute a coil-winding portion. Inter-coil wires are disposed between the protrusions formed by the recesses 23 and 24a.

Only the portion of the molding die 18 corresponding to each tooth 14 has been described with reference to FIG. 3. However, a portion of the molding die 18 corresponding to each tooth 13 has substantially the same construction. Accordingly, upper and lower second supports are formed on a portion of the inner surface of the molding die 18 corresponding to the tooth 13 so as to abut the distal end face of the tooth to support the latter although neither of them is shown. The exposed portions 16a and 16b are formed by these supports. In the embodiment, the supports 19a and 19b etc. are constructed so that a portion of the tooth 14 pressed by the supports 19a and 19b has a larger area than a portion of the tooth 13 pressed by the second supports. As a result, a total area of the exposed portions 17a and 17b is larger than a total area of the exposed portions 16a and 16b. Furthermore, the supports 19a and 19b are constructed so that a sum (H1+H2) of the axial dimensions H1 and H2 of the exposed portions 16a and 16b is set to be equal to or larger than 20% of the axial dimension G of the stator core 11, as shown in FIG. 2. The aforesaid is also applied to the exposed portions 17a and 17b.

Figure 4A:
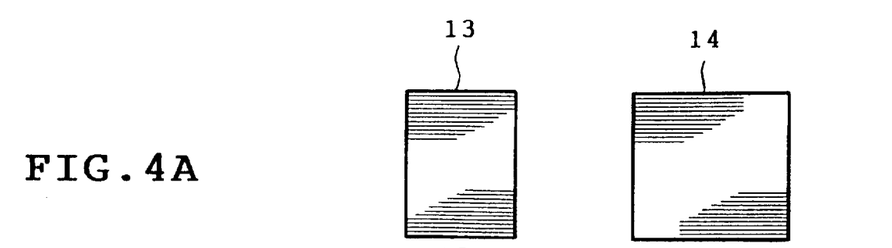
FIGS. 4A to 4E are views explaining the process for injecting the resin into the distal end of the tooth.
Figure 4B:
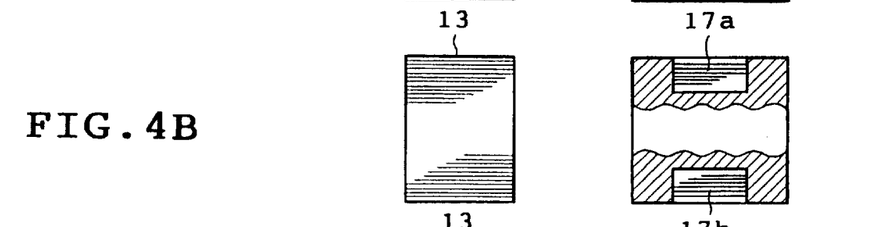
Figure 4C:
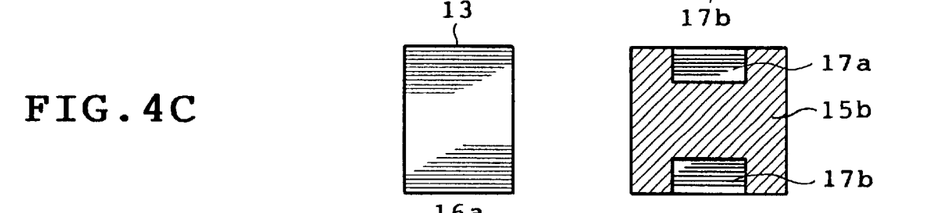
Figures 4D, 4E:
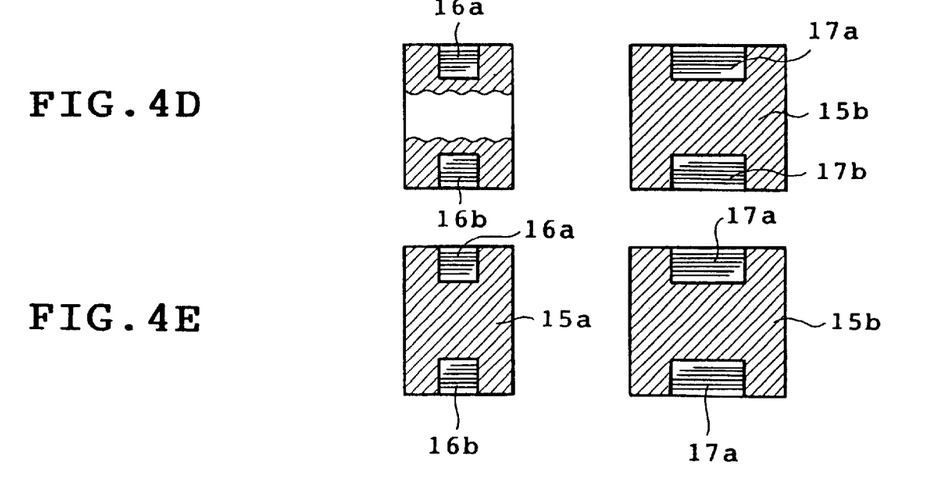
Figure 5:
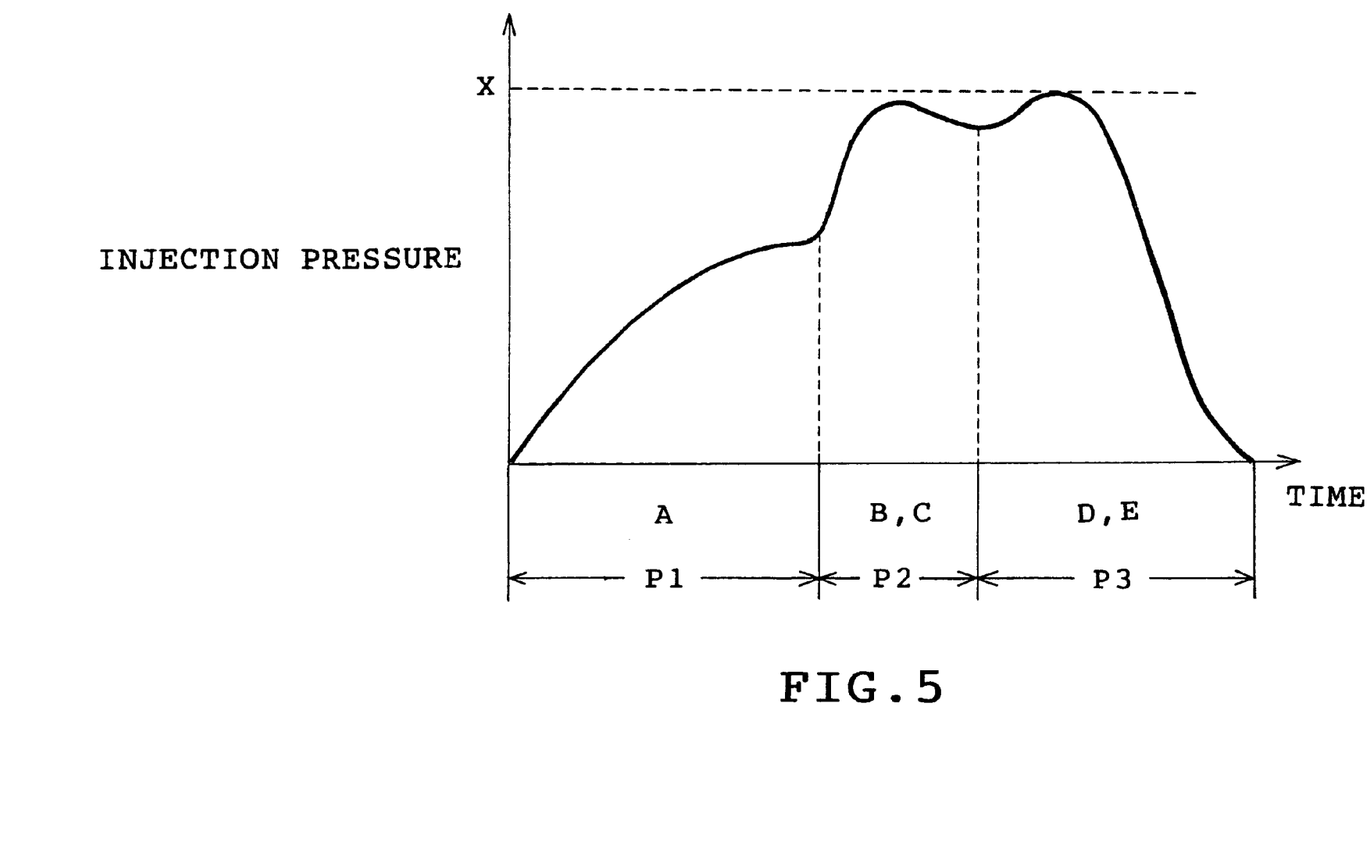
FIG. 5 is graph showing the variations in the injection pressure in the resin injecting process.

A molten resin injection process and an injection pressure in the forming of the resin cover 15 by the injection molding will now be described with reference to FIGS. 3 to 5. FIGS. 4A to 4E show stages of the process of injecting the molten resin to the distal end faces of the teeth 13 and 14. FIG. 5 shows the relationship between the molded resin injecting process and the injection pressure. Referring first to FIG. 3, when injected through the gate 20, the molten resin flows along an upper face of the yoke 12 and an upper face of the tooth 14 in the molding die 18 as shown by arrows. The molten resin further flows along the inner circumferential face of the yoke 12 and the underside of the tooth 14 toward the distal end of the tooth 14. The above is also applied to the teeth 13. Accordingly, the molten resin first covers the outer face of the yoke 12. At this time, the molten resin has not reach the distal ends of the teeth 13 and 14 as shown in FIG. 4A.

The gates 20 are formed in the yoke 12 so as to correspond to the root portions of the teeth 14 respectively. Further, the radial dimension B1 of each tooth 14 is set to be smaller than the axial dimension A1 of each tooth 13, and the circumferential dimension D of the distal end of each tooth 14 is set to be larger than the circumferential dimension C of the distal end of each tooth 13. Further, the molding die 18 is constructed so that the thickness F of the distal end resin cover 15b is larger than the thickness E of the distal end resin cover 15a or so that the gap between the distal end of each tooth 13 and the molding die 18. Accordingly, the distance that the molten resin flows from the gate 20 to the distal end of the tooth 14 and the flow resistance at this time are smaller than the distance that the molten resin flows from the gate 20 to the distal end of the tooth 13 and the flow resistance at this time. Consequently, the molten resin is apt to flow to the tooth 14 rather than to the tooth 13. That is, when injected to the outer face of the yoke 12, the molten resin then flows along the tooth 14 in the molding die 18, filling the upper and lower portions of the tooth 14 as shown in FIG. 4B. When the injection progresses further, the molten resin fills the die cavity so that the distal end face of the tooth 14 is completely immersed in it as shown by FIG. 4C.

When the distal end face of the tooth 14 is completely immersed in the injected molten resin, the resistance or pressure is suddenly increased in the part of the interior of the molding die 18 corresponding to the tooth 14. Accordingly, the molten resin starts to flow along the outer face of the tooth 13 so that the upper and lower distal end faces of the tooth 13 are immersed in it as shown in FIG. 4D. Upon progress of the filling, the distal end face of the tooth 13 is completely immersed in the molten resin as shown in FIG. 4E. Upon completion of the filling, the molten resin is hardened and then, the injection molding is finished. The molded core 100 is removed from the molding die 18 and thereafter, coils (not shown) are wound on coil-winding sections of the core respectively so that the core is constructed into a stator for the outer rotor type motor.

FIG. 5 shows the variations in the injection pressure in the above-described filling process. Symbols A to E designate the stages of the filling process shown in FIGS. 4A to 4E respectively. A large injection pressure is required when the molten resin fills the die cavity so that the outer face of the tooth 13 or 14 is immersed in it. In the embodiment, the times the molten resin fills the die cavity so that the teeth 13 and 14 are immersed in it are staggered to a large extent relative to each other. This filling manner results in occurrence of two peaks of the injection pressure as shown in FIG. 5. More specifically, the injection pressure is relatively lower at an initial stage P1 where the molten resin mainly fills the die cavity so that the yoke 12 is immersed in it. Further, the injection pressure is slightly lower than the maximum injection pressure X at a stage P2 where the molten resin mainly fills the die cavity so that each tooth 14 is immersed in it. The injection pressure is at its maximum X at a stage P3 where the molten resin mainly fills the die cavity so that each tooth 13 is immersed in it.

According to the above-described embodiment, the gates 20 are disposed and the shapes of the teeth 13 and 14 differ from each other so that the fluidity of the molten resin differs between the case where the molten resin fills the die cavity so that the outer face of each tooth 13 is immersed in it and the case where the molten resin fills the die cavity so that the outer face of each tooth 14 is immersed in it. Further, the distal end resin cover portion 15a formed on the distal end face of each tooth 13 has a larger thickness than the distal end resin cover portion 15b formed on the distal end face of each tooth 14. Consequently, the times the molten resin fills the die cavity so that the outer faces of the teeth 13 and 14 are immersed in it can be staggered relative to each other. In the prior art, the molten resin fills the die cavity so that all the teeth are concentrically immersed in it, whereupon the injection pressure in the filling is dispersed to all the individual teeth. In the foregoing embodiment, however, the injection pressure in the filling is dispersed only to one half of all the teeth. Accordingly, since the injection pressure is prevented from being reduced at each tooth, the molten resin can be caused to fill the die cavity so that the distal ends of the teeth 13 and 14 are immersed in it.

Further, the radial dimensions A1 and B1 of the teeth 13 and 14 are set so that A1>B1. Consequently, since occurrence of cogging is reduced when a brushless motor comprises the molded core 100, noise and oscillation can be reduced. Further, the thicknesses E and F of the distal end resin cover portions 15a and 15b respectively are set so that E<F. The radial dimensions A2 and B2 of the portions of the core 100 corresponding to the respective teeth 13 and 14 are set to become substantially equal to each other. Consequently, since a substantially uniform air gap is defined between the stator and the rotor of the brushless motor, wind noise due to rotation of the rotor can be reduced, and the center of rotation of the rotor can easily be aligned with an axial center of the stator.

According to experiments conducted by the inventors, the fluid resistance of the molten resin in which the distal end of each of the teeth 13 and 14 is immersed is increased when the thickness of each of the resin cover portions 15a and 15b is less than 0.3 mm. As a result, it is difficult to cause the molten resin to fill the die cavity so that the distal end of each tooth 13 or 14 is immersed in the molten resin. This requires to increase the injection pressure. On the other hand, when the thickness of each resin cover portion 15a or 15b exceeds 1.0 mm, the air gap between the stator and the rotor is increased, whereupon the motor performance is reduced. In the foregoing embodiment, however, the thicknesses E and F of the respective resin cover portions 15a and 15b are each set to range between 0.3 and 1.0 mm. Consequently, the molten resin can be caused to fill the die cavity so that the distal ends of the respective teeth 13 and 14 are immersed in it, and accordingly, the motor performance can be improved.

Figure 6:
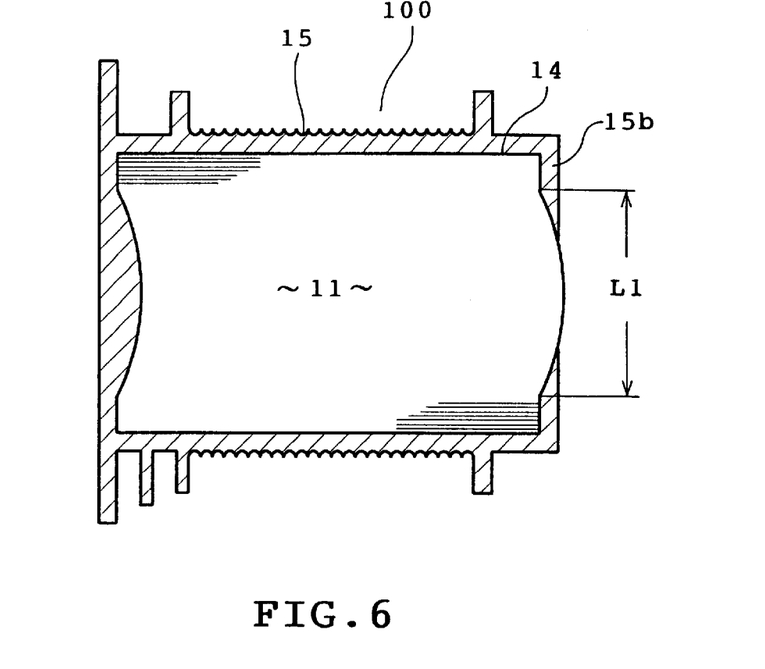
FIG. 6 shows an example in which the laminated steel sheets of the stator core have displaced horizontally during the molding.

In the arrangement that the gates 20 are formed in the molding die 18 so as to correspond to the yoke 12 of the stator core 11 placed in the die, the injection pressure in the injection of the molten resin slightly radially moves part of the laminated steel sheets composing the stator core. It is difficult to prevent this lateral slippage. A part of the outer face of the stator core 11 outwardly projects upon occurrence of the lateral slippage as shown in FIG. 6. The lateral slippage becomes more conspicuous as an area of a portion pressing against the end face of each tooth 13 or 14, such as the supports 19a and 19b, is small. Further, the dimension of an outwardly projecting portion becomes larger as the axial dimension L1 of the projecting portion is rendered larger by the lateral slippage. Further, when the dimension of the projecting portion is large, the molten resin does not fill the die cavity so that the distal ends of the teeth 13 and 14 are immersed in it. As a result, the distal end faces of the teeth 13 and 14 are exposed.

Figure 7:
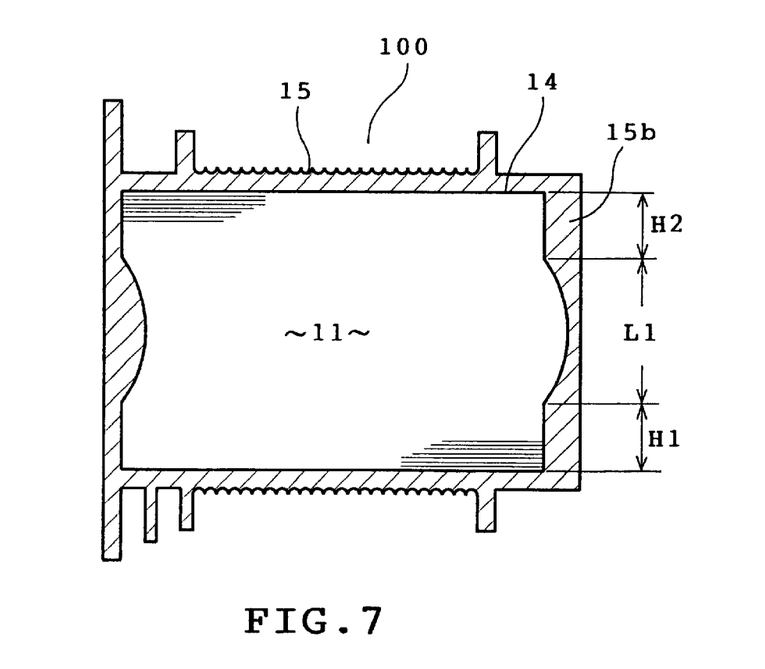
FIG. 7 shows another example in which the laminated steel sheets of the stator core have displaced horizontally during the molding.

In view of the foregoing problem, the area of the pressing portion such as the supports 19a and 19b is set in the embodiment so that the dimension of the outwardly projecting portion does not actually result in any problem. According to an experiment conducted by the inventors, in a case where the stator core 11 has the radial dimension A1 set at or above 100 mm and the axial dimension or thickness G set at or above 20 mm, the support of the stator core 11 by the supports 19a and 19b etc. is insufficient when the sum total of the axial dimensions of the portions pressing against the distal end faces of the teeth 13 and 14 is less than 20% of the axial dimension G of the stator core 11. As a result, deformation of the stator core 11 due to the lateral slippage is increased. In view of this problem, in the embodiment, the sum of the axial dimensions of portions pressing against the distal ends of the teeth 13 and 14, such as the supports 19a and 19b is set to be equal to or larger than 20% of the axial dimension G of the stator core 11. In other words, the sum total (H1+H2) of the axial dimensions of the exposed portions 16a and 16b and the sum total (H1+H2) of the axial dimensions of the exposed portions 17a and 17b are each set to be equal to or larger than 20% of the axial dimension G of the stator core 11. Consequently, the stator core 11 can be prevented from being deformed to a large extent during the molding since the axial dimension L1 of the swollen portion due to the lateral slippage is reduced as shown in FIG. 7. This can prevent a deficiency that the distal end of each tooth 13 or 14 outwardly projects to be exposed.

Further, the circumferential dimensions of the exposed portions 16a, 16b, 17a and 17b are set according to the circumferential dimensions of the distal end faces of the teeth 13 and 14 respectively. Consequently, the strength of each of portions pressed by the supports 19a and 19b of the teeth 13 and 14 can be increased.

The invention is applied to the stator of the motor of the outer rotor type in the foregoing embodiment. However, the invention may be applied to a stator of an electric motor of the inner rotor type, instead. In this case, the teeth extend inward from an inner circumference of the yoke.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined in the appended claims.

We claim:

1. A molded core for an electric motor, which includes a resin cover formed by placing a stator core in a cavity of a molding die and injecting a molten insulating resin into the cavity of the molding die so that a resin cover is formed on an outer surface of the stator core by means of molding, the molded core comprising:

a generally annular yoke;

a plurality of teeth radially extending from the yoke, the yoke and the teeth constituting the stator core, the teeth including alternately arranged first and second teeth, each first tooth having a larger radial dimension than each second tooth; and a plurality of distal end resin cover portions included in the resin cover and covering distal end faces of the teeth respectively, the distal end resin cover portions having different radial dimensions, the distal end resin cover portion of each second tooth having a larger radial dimension than the distal end resin cover portion of each first tooth, wherein a sum of the radial dimension of each tooth and the radial dimension of the distal end resin cover portion of each tooth is substantially uniform.

2. The molded core according to claim 1, wherein the first teeth include narrow teeth each having a smaller distal end circumferential dimension than the second teeth and the second teeth include wide teeth each having a larger distal end circumferential dimension.

3. The molded core according to claim 2, wherein the radial dimension of each distal end resin cover portion ranges between 0.3 and 1.0 mm.

4. The molded core according to claim 2, wherein the molding die includes a first support pressed against a distal end face of each wide tooth of the stator core placed in the molding die so as to support the stator core and a second support pressed against a distal end face of each narrow tooth so as to support the stator core, and wherein each first support has a portion which is pressed against the wide tooth and which has an area larger than an area of a portion of each second support pressed against the distal end face of the narrow tooth.

5. The molded core according to claim 4, wherein when the stator core has an axial dimension of 20 mm or more and an outer diameter of 100 mm or more, an axial dimension of the portion of the distal end face of each wide tooth pressed by the corresponding first support is set to be equal to or larger than 20% of the axial dimension of the stator core, and an axial dimension of the portion of the distal end face of each narrow tooth pressed by the corresponding second support is set to be equal to or larger than 20% of the axial dimension of the stator core.

6. The molded core according to claim 1, wherein the radial dimension of each distal end resin cover portion ranges between 0.3 and 1.0 mm.

7. The molded core according to claim 1, wherein the molding die has a plurality of gates through which the insulating resin is injected into the cavity of the molding die, the gates being formed in a portion of the molding die corresponding to the yoke and disposed near the teeth having the distal end resin cover portions with a larger radial dimension respectively.

* * * * *